United States Patent
Zaborszki et al.

(10) Patent No.: US 11,549,619 B2
(45) Date of Patent: Jan. 10, 2023

(54) CORRUGATED HOSE WELD END

(71) Applicant: Swagelok Company, Solon, OH (US)

(72) Inventors: Stephen J. Zaborszki, Northfield Center, OH (US); Corey Pasheilich, Solon, OH (US); Harry Anton Nedelka, III, Ravenna, OH (US)

(73) Assignee: SWAGELOK COMPANY, Solon, OH (US)

( * ) Notice: Subject to any disclaimer, the term of this patent is extended or adjusted under 35 U.S.C. 154(b) by 98 days.

(21) Appl. No.: 16/803,374

(22) Filed: Feb. 27, 2020

(65) Prior Publication Data

US 2020/0278055 A1    Sep. 3, 2020

Related U.S. Application Data

(60) Provisional application No. 62/811,569, filed on Feb. 28, 2019.

(51) Int. Cl.
*F16L 13/02* (2006.01)
*F16L 11/15* (2006.01)
*F16L 25/00* (2006.01)
*B29C 65/02* (2006.01)

(52) U.S. Cl.
CPC .......... *F16L 13/0209* (2013.01); *B29C 65/02* (2013.01); *F16L 11/15* (2013.01); *F16L 25/0036* (2013.01)

(58) Field of Classification Search
CPC ............... F16L 25/0036; F16L 13/0209; F16L 13/0236; F16L 13/141; F16L 33/26
USPC .................... 285/288.1, 288.9, 903
See application file for complete search history.

(56) References Cited

U.S. PATENT DOCUMENTS

| | | | |
|---|---|---|---|
| 2,516,631 | A | 7/1950 | Franz |
| 2,666,657 | A | 1/1954 | Howard |
| 3,023,496 | A | 3/1962 | Humphrey |
| 3,307,589 | A | 3/1967 | Sheffield |
| 4,089,351 | A | 5/1978 | Ward |
| 4,227,639 | A | 10/1980 | Blumenberg |

(Continued)

FOREIGN PATENT DOCUMENTS

| | | |
|---|---|---|
| CN | 201198932 | 2/2009 |
| CN | 201925625 | 8/2011 |

(Continued)

OTHER PUBLICATIONS

International Search Report and Written Opinion from PCT/US20/20258 dated Jun. 4, 2020.

(Continued)

*Primary Examiner* — Zachary T Dragicevich
(74) *Attorney, Agent, or Firm* — Calfee, Halter & Griswold LLP

(57) ABSTRACT

A hose assembly includes a corrugated metal tube having a plurality of corrugations and an outer cuff portion extending from an endmost one of the plurality of corrugations, radially outward of an inner diameter of the endmost corrugation, an end connection having an outer end defining a fluid connector and an inner end defining a nose portion received in the outer cuff portion of the corrugated metal tube, and a collar surrounding the outer cuff portion of the corrugated metal tube and the nose portion of the end connection. The collar, the outer cuff portion, and the nose portion are welded together.

19 Claims, 6 Drawing Sheets

(56) References Cited

U.S. PATENT DOCUMENTS

| | | | |
|---|---|---|---|
| 4,400,022 A * | 8/1983 | Wright | F16L 25/0036 |
| | | | 285/903 |
| 4,691,550 A | 9/1987 | Dietzel | |
| 5,069,253 A | 12/1991 | Hadley | |
| 5,263,747 A | 11/1993 | Lefebvre | |
| 5,297,586 A | 3/1994 | McIntosh | |
| 5,511,720 A | 4/1996 | Zaborszki | |
| 5,511,828 A | 4/1996 | Kurek | |
| 5,638,869 A | 6/1997 | Zaborszki | |
| 5,803,511 A | 9/1998 | Bessette | |
| 5,813,438 A | 9/1998 | Reed | |
| 5,984,375 A * | 11/1999 | Merrett | F16L 25/0036 |
| | | | 285/903 |
| 6,016,842 A | 1/2000 | Rooke | |
| 6,561,690 B2 | 2/2003 | Chen | |
| 8,727,338 B2 | 5/2014 | DiPalma | |
| 8,844,579 B2 | 9/2014 | Eguchi | |
| 8,997,794 B2 | 4/2015 | Kwon | |
| 9,273,810 B1 | 3/2016 | Martin | |
| 2004/0112454 A1 | 6/2004 | Takagi | |
| 2005/0229990 A1 * | 10/2005 | Hilgert | F16L 25/0036 |
| 2006/0125233 A1 * | 6/2006 | Cantrell | F16L 25/0036 |
| 2007/0079885 A1 | 4/2007 | Zaborszki | |
| 2020/0269517 A1 * | 8/2020 | Kullik | F16L 25/0036 |

FOREIGN PATENT DOCUMENTS

| | | | |
|---|---|---|---|
| DE | 102014114470 | 4/2014 | |
| EP | 719970 | 2/1983 | |
| EP | 202481 | 11/1986 | |
| EP | 939266 | 9/1999 | |
| EP | 1707860 | 3/2009 | |
| EP | 2469143 | 6/2012 | |
| EP | 2327914 | 8/2013 | |
| FR | 2759141 A1 * | 8/1998 | F16L 25/0036 |

OTHER PUBLICATIONS

International Search Report from PCT/US2021/047469 dated Nov. 17, 2021.

Office action from U.S. Appl. No. 17/411,423 dated Sep. 1, 2022.

* cited by examiner

CORRUGATED HOSE WELD END

CROSS-REFERENCE TO RELATED APPLICATION

This application claims priority to and all benefit of U.S. Provisional Patent Application Ser. No. 62/811,569, filed on Feb. 28, 2019 and entitled CORRUGATED HOSE WELD END, the entire disclosure of which is incorporated herein by reference.

TECHNICAL FIELD

The present disclosure relates to flexible hose assemblies and to methods of making flexible hose assemblies. More particularly, the disclosure relates to flexible metal hoses having a weld connection between a corrugated tube (e.g., annular or helical) and an end connection configured to minimize or eliminate entrapment areas between the corrugated tube end and the welded end connection.

SUMMARY OF THE DISCLOSURE

In accordance with an embodiment of one or more of the inventions presented in this disclosure, a hose assembly includes a corrugated metal tube having a plurality of corrugations and an outer cuff portion extending from an endmost one of the plurality of corrugations, radially outward of an inner diameter of the endmost corrugation, an end connection having an outer end defining a fluid connector and an inner end defining a nose portion received in the outer cuff portion of the corrugated metal tube, and a collar surrounding the outer cuff portion of the corrugated metal tube and the nose portion of the end connection. The collar, the outer cuff portion, and the nose portion are welded together.

In accordance with another embodiment of one or more of the inventions presented in this disclosure, a method of making a hose assembly is contemplated. In the exemplary method, a corrugated metal tube is provided, including a plurality of corrugations and an outer cuff portion extending from an endmost one of the plurality of corrugations, radially outward of an inner diameter of the endmost corrugation. A nose portion of an end connection is inserted into the outer cuff portion of the corrugated metal tube. A portion of a collar is positioned around the outer cuff portion of the corrugated metal tube and the nose portion of the end connection. The portion of the collar, the outer cuff portion, and the nose portion are welded together to sealingly join the end connection with the corrugated metal tube.

DESCRIPTION OF THE EXEMPLARY EMBODIMENTS

Figure 1:
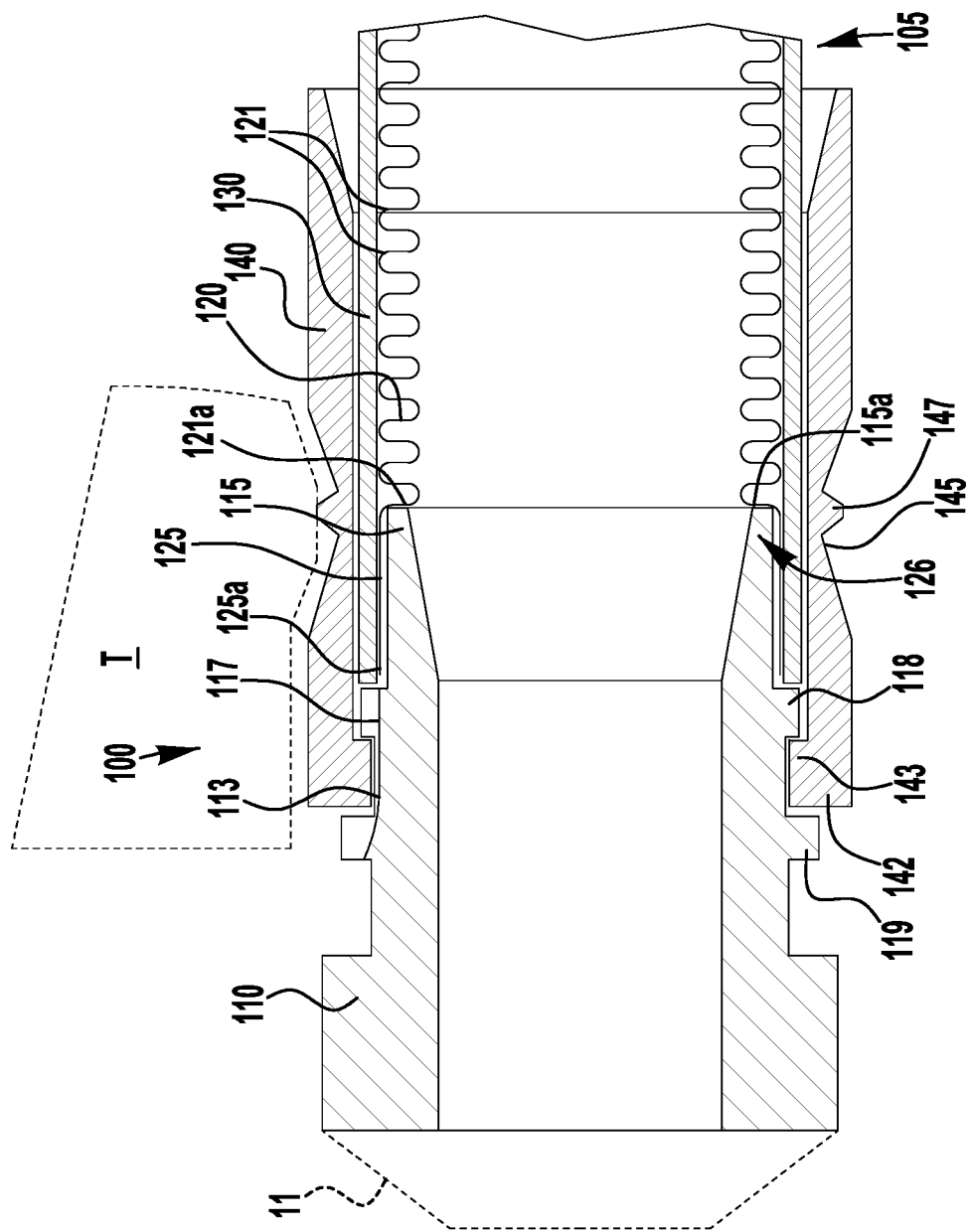
FIG. 1 is a cross-sectional view of an end portion of a hose assembly, shown in a loosely assembled condition, in accordance with an exemplary embodiment of the present disclosure.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Many applications have requirements for flexible hose to provide a fluid connection between two points in a fluid system, with the flexibility of the hose allowing for various fluid line routing requirements, thermal expansion, misalignment, and intermittent or continuous flexing (e.g., due to system vibrations). A flexible metal hose configured to provide, for example, desired system temperature ratings, system pressure ratings, chemical compatibility, and gas impermeability, commonly includes an inner metal tube corrugated to promote flexibility and an outer sheath, cover or other such reinforcement layer (e.g., a metal braided sheath) providing protection for the metal tube while permitting bending movement.

To facilitate installation into a fluid system, hose assemblies are commonly provided with any of a variety of end connectors, including, for example, tube fittings, tube ends (e.g., for welding or installation in a tube fitting), or quick disconnect couplings, and therefore require a leak-tight connection between the inner and outer flexible hose tube components and the end connection. For metal hose assemblies, such end connectors are commonly welded to the hose ends. In some such applications, welds performed on metal tube corrugations and sheath braiding of a metal hose may generate contaminants and/or entrapment areas, which may be undesirable in some fluid systems.

According to an exemplary aspect of the present disclosure, a metal hose and welded end connection may be configured to provide a welded zone free from entrapment areas by separating the welded zone from the tube corrugations and sheath braiding. Consistent exclusion of the tube corrugations and sheath braiding may allow for automatic (e.g., orbital) welding of the hose ends, thereby reducing weld times and weld skill requirements, and providing for improved yields of leak tight assemblies.

Figure 2:
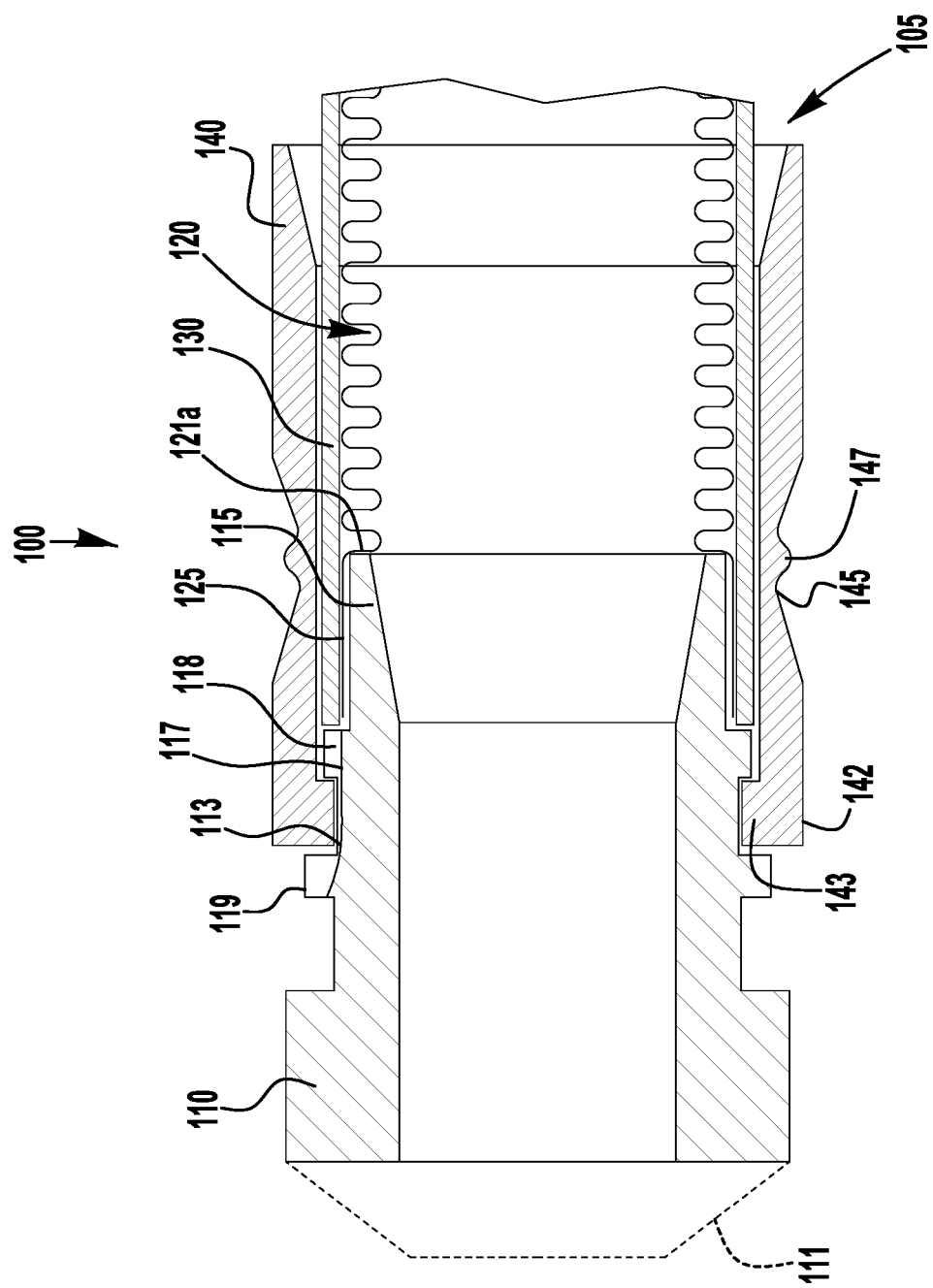
FIG. 2 is a partial cross-sectional view of the hose assembly of FIG. 1, shown in a crimped, pre-welded condition.
Figure 3:
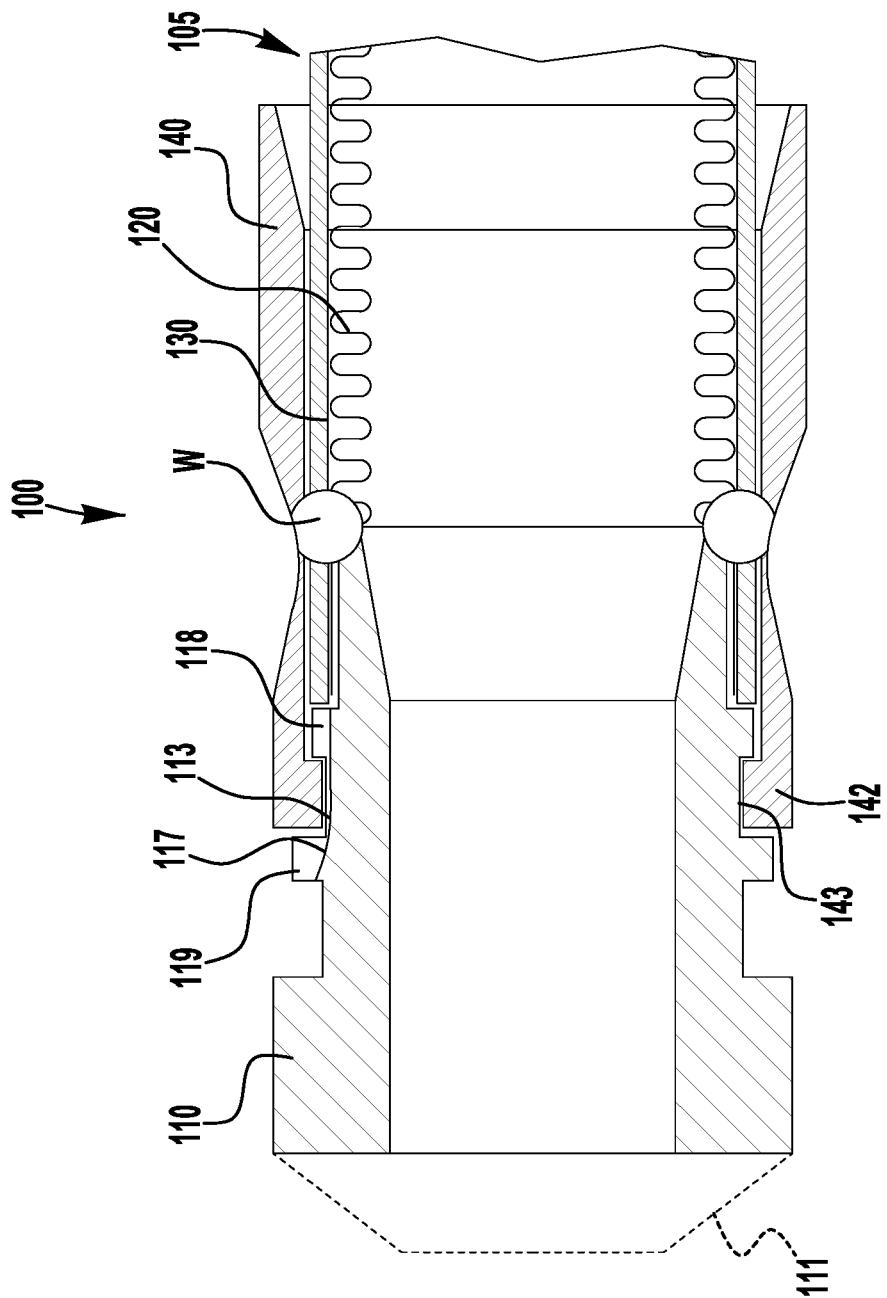
FIG. 3 is a partial cross-sectional view of the hose assembly of FIG. 1, shown in a welded condition.

In an exemplary embodiment, as shown in the cross-sectional views of FIGS. 1-3, a metal hose assembly 100 includes a metal end connection 110 having a connector (shown schematically at 111) for connecting with a fluid system (e.g., a tube fitting, tube stub, quick disconnect coupling), a hose 105 including a corrugated metal tube 120 and surrounding sheath 130 (e.g., a braided metal sheath), and metal weld collar 140. The hose assembly components may be provided in any suitable material, including, for example, stainless steel, Hastelloy®, and other alloys that can be autogenously welded. Further, while the drawings only show one end of the hose assembly 100, it is to be understood that an opposite end of the hose assembly may, but need not, include a similar end connection and corresponding attachment arrangement.

The corrugated tube 120 includes a plurality of corrugations 121 and a substantially cylindrical outer cuff portion 125 extending from an endmost one 121a of the plurality of corrugations 121, radially outward of an inner diameter of the endmost corrugation, to define an interior space or socket 126 receiving an inner end nose portion 115 of the end connection 110. This outward positioning of the cuff portion 125, in contrast to an inward crimping or other such modification to facilitate attachment to an end connection, eliminates or minimizes any reduction in the hose assembly's through diameter and resulting flow rate. As installed, the cuff portion 125 may be positioned on the end connection nose portion 115 by abutment of the endmost corrugation 121a with the inner end 115a of the nose portion. Alternatively, the cuff portion 125 may be positioned on the end connection nose portion 115 by abutment of the outermost edge 125a of the cuff portion 125 with a shoulder or flange 118 on the end connection 110. In either such arrangement, the cuff portion 125 may be sized to provide for repeatable alignment with the end connection nose portion by simple insertion of the nose portion to a hard stop or abutting condition.

Figure 1A:
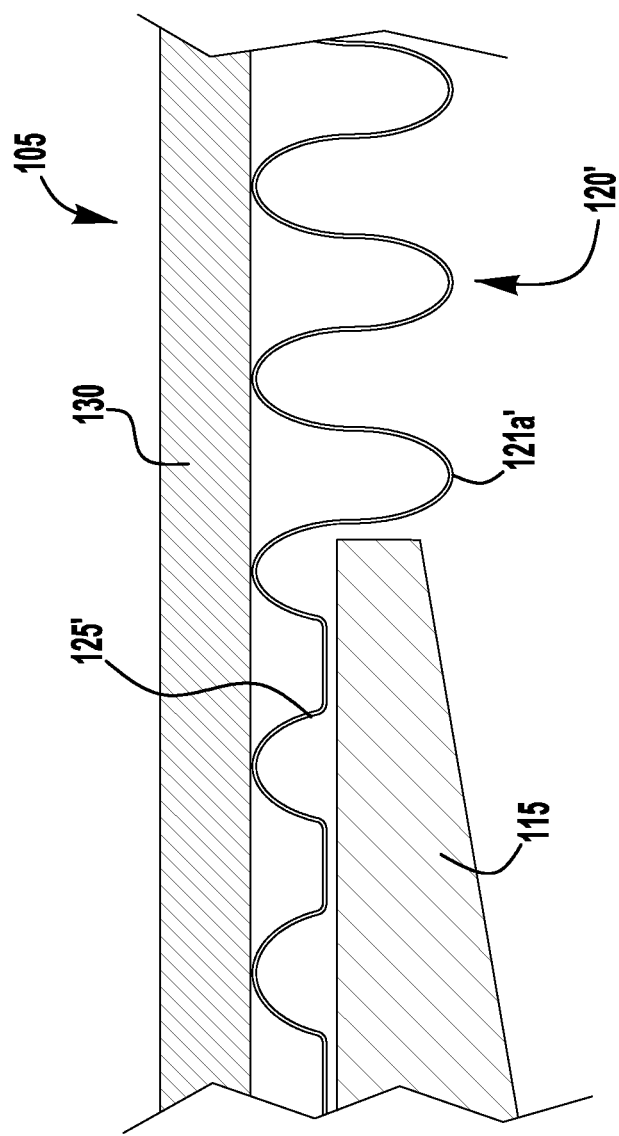
FIG. 1A is an enlarged partial cross-sectional view of a hose and end connection of a pre-welded hose assembly using a partially expanded cuff, in accordance with another exemplary embodiment of the present disclosure.

The outer cuff portion of the corrugated tube may be formed from a variety of processes, including use of expansion dies, roll forming, extrusion, welding, and heat pressing. In an exemplary embodiment, a forming tool may be inserted into the hose to outwardly compress or flatten the endmost corrugations or convolutions of the tube, forming the outer cuff portion from the flattened endmost corrugations, with the endmost non-flattened corrugation 121a defining the innermost end of the socket 126. In one embodiment, as shown in FIGS. 1, 2, and 3, the outer cuff portion 125 may be substantially cylindrical, with a diameter approximating the outer diameter of the tube corrugations 121. In other embodiments, as shown for example in FIG. 1A, the outer cuff portion 125' may be formed by only partially expanding or deforming the endmost corrugations, such that an inner diameter of the partially expanded corrugations is sized to receive the nose portion 115 of the end connection 110, with the endmost non-flattened corrugation 121a' defining the innermost end of the socket 126'. In one such embodiment, the endmost corrugations may be partially expanded to an inner diameter at least approximately halfway between the inner and outer diameters of the undeformed corrugations. In some such embodiments, formation of an outer cuff portion by partial expansion of the endmost corrugations may prevent weakening or splitting of the tube due to overexpansion, and/or may provide for a closer fit between the hose end and the end connection nose portion.

To position and secure the corrugated tube 120 and end connection 110 prior to welding, the weld collar 140 is positioned around the cuff portion 125 and the nose portion 115, with an inner end portion 141 of the weld collar slipped over the cuff portion and nose portion, such that the outer cuff portion 125 of the corrugated tube 120 is captured between the nose portion and the weld collar. The weld collar may be mechanically attached to the end connection, for example, to maintain a desired axial position of the weld collar on the end connection prior to welding. A variety of attachment configurations may be utilized, including, for example, one or more of press fit engagement, clamping, crimping, threaded engagement, and interlocking tabs and slots or other such features. In the illustrated embodiment, an outer end portion 142 of the weld collar 140 includes a radially inward extending lip 143 that is received in interlocking engagement with an outer circumferential groove 113 in the end connection 110, to securely position the weld collar in a desired axial alignment with the end connection (as shown in FIG. 2), with a weld zone defining central portion 145 of the weld collar 140 aligning with the nose portion 115 of the end connection. This "lock dog" type engagement may be achieved, for example, by crimping the outer portion of the weld collar 140 inward, using a crimping tool (shown schematically in phantom at T in FIG. 1). The interlocking engagement of the weld collar 140 with the end connection 110, combined with the hard stop alignment of the cuff portion 125 with the inserted nose portion 115, provides for consistent alignment of the portions 115, 125, 145 to be welded.

This same inward crimping may also effect a compression of the weld zone defining central portion 145 of the weld collar 140 against the metal sheath 130, the outer cuff portion 125 of the corrugated tube 120 and the nose portion 115 of the end connection 110 for tight, weld facilitating engagement of these portions 115, 125, 130, 145. In some applications, this tight engagement with the core tube may allow for welding a wider variety of core tubes, including, for example, helical and multi-ply helical core tubes, and/or may promote withdrawal of weld heat away from the braid wire resulting in maintaining cold worked strength in the wire.

As shown in the illustrated embodiment, the central portion 145 of the weld collar 140 may be thinned down to facilitate weld penetration, and to control the edge of the weld puddle for improved weld aesthetics.

While many different types of weld arrangements may be used, the end connection 110, corrugated tube 120, and weld collar 140 may be configured to accommodate an autogenous weld, by which the weld may be formed by the end connection, corrugated tube, and weld collar materials without the addition of a filler material. In such an arrangement, the thinned-down, welding zone defining central portion 145 of the weld collar may (but need not) include an enlarged rib 147 providing sacrificial weld material to facilitate formation of the autogenous weld. This enlarged rib may further facilitate weld positioning or component alignment. In other embodiments, the welded assembly may use a filler material. Further, the welding operation may involve movement of the weld electrode around the weld collar (i.e., an orbital weld), or rotation of the workpiece components proximate a stationary electrode.

As a result of an autogenous welding operation, portions of the nose portion 115, outer cuff 125 and weld collar central portion 145 are consumed in a weld puddle during a welding operation to form a uniform, full penetration weld bead W, as shown in FIG. 3. Because the outer cuff portion 125, and optionally, the surrounding sheath 130, extend around and axially outward of the welded portion of the end connection nose portion 115, the outermost edges of the cuff portion 125 and sheath 130 are disposed outside of the hose flowpath (i.e., are not wetted), and therefore do not form entrapment areas or loose burrs or other contaminants within the flowpath. This facilitates cleaning, and maintaining a clean condition, of the internal flowpath of the hose. Further, the extension of the braided sheath 130 past the welding zone (over and past the end connection nose portion 115) ensures that all braid wires are included in and penetrated by the weld, as compared to welding of a terminated end of a braided sheath, in which one or more of the terminated braid wires may pull or melt back and not be included in the weld. In the present invention, the braid is penetrated by the weld.

Figure 4:
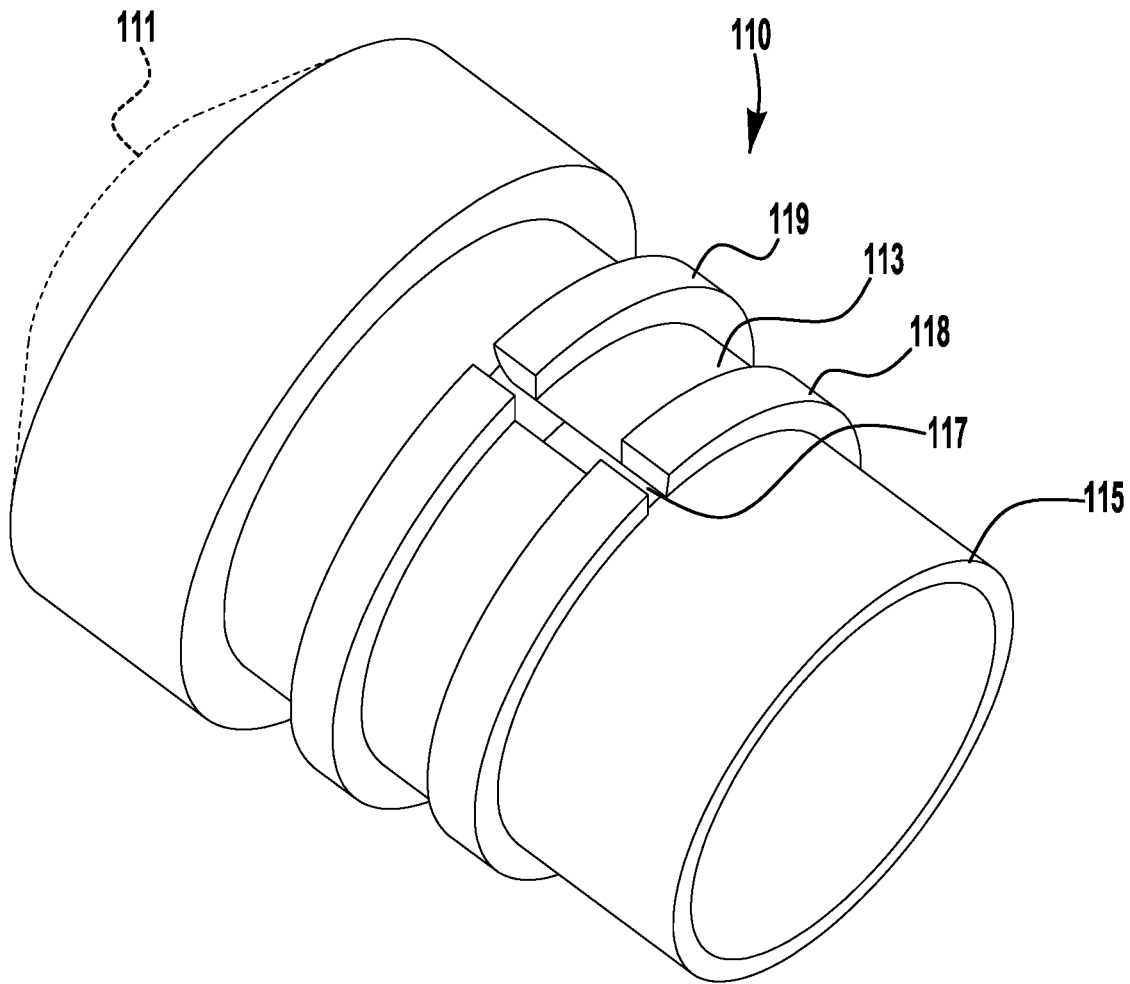
FIG. 4 is a perspective view of the end connection of the hose assembly of FIG. 1.

The weld arrangement described above may produce an enclosed space between the weld zone and the crimped end lip 143 of the weld collar 140, into which the ends of the outer cuff 125 and sheath 130 extend. In another exemplary feature of the hose assembly, an outer surface of the end connection extending across this enclosed space may include an axially extending groove or notch allowing for venting of weld gases during welding, for example, to prevent a weld blowout. In the illustrated example, as shown in the perspective view of FIG. 4, the end connection 110 may include an axially extending notch 117 formed across the flanges 118, 119 and recessed into the groove 113.

Figure 4A:
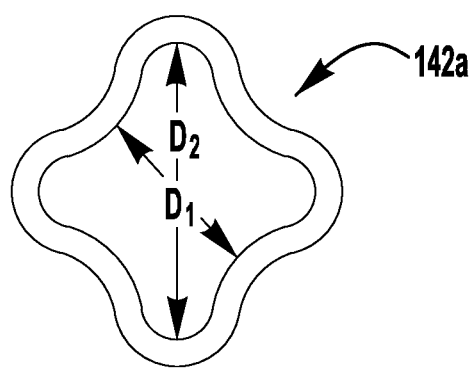
FIG. 4A is a schematic end view of a crimped end portion of a weld collar, in accordance with another exemplary embodiment of the present disclosure.

In an alternative embodiment, the outer end portion of the weld collar may be provided with a discontinuous crimp, such that uncrimped (or less heavily crimped) portions of the weld collar outer end portion provide flow paths for the venting of weld gases. FIG. 4A schematically illustrates a crimping arrangement for a weld collar end portion 142a, having a lobed or "cloverleaf" configuration, by which a minor diameter $D_1$ provides sufficient interlocking engagement between the weld collar and the end connection, and a major diameter $D_2$ provides vent passages for the weld gases.

In another embodiment, a welded hose end arrangement may rely on press fit engagement between the hose and the weld collar to position and align the weld collar with respect to the end connection prior to welding, thereby allowing for a simplified weld collar, for example, eliminating or omitting any lock dog arrangement or other such interlocking connection prior to welding.

Figure 5:
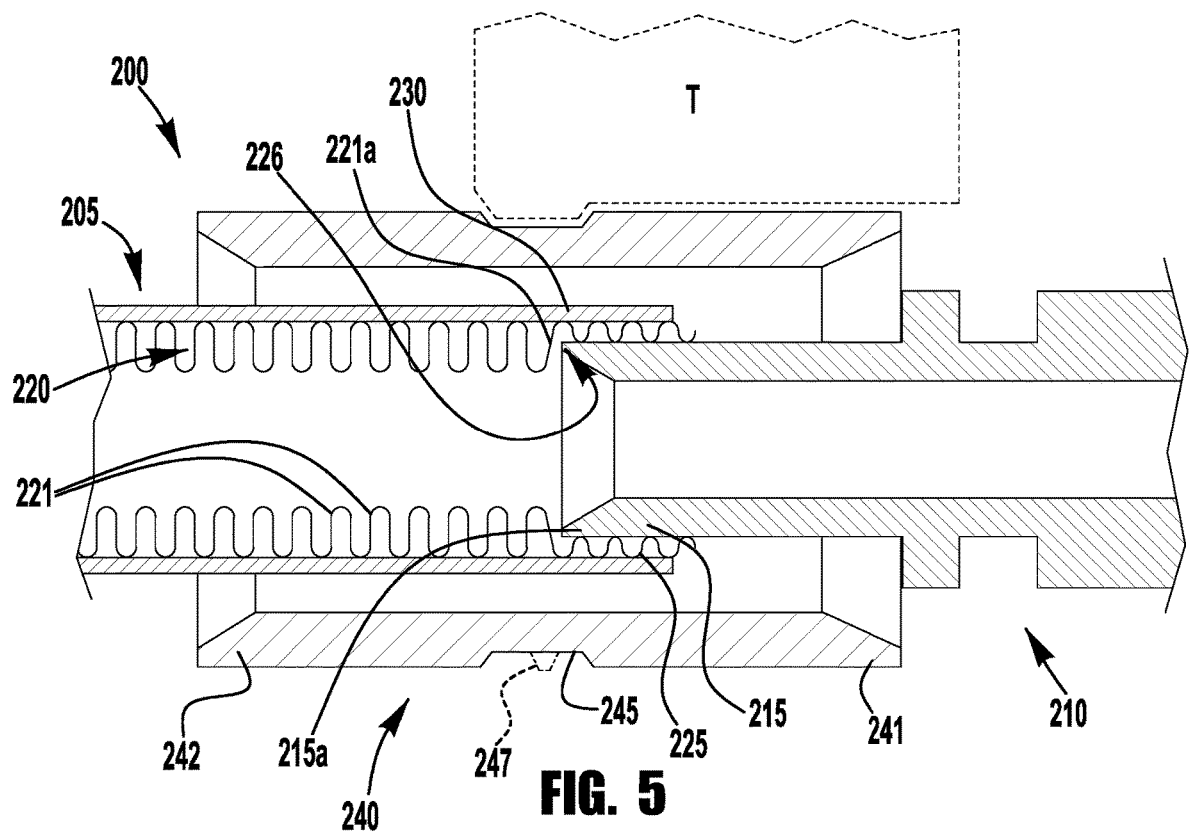
FIG. 5 is a cross-sectional view of an end portion of a hose assembly, shown in a loosely assembled condition, in accordance with another exemplary embodiment of the present disclosure.

FIG. 5 illustrates another exemplary metal hose assembly 200 in a loosely assembled (i.e. pre-crimped and pre-welded) condition, including a metal end connection 210, a hose 205 including a corrugated metal tube 220 and surrounding sheath 230 (e.g., a braided metal sheath), and metal weld collar 240, similar to the hose components of the embodiment of FIGS. 1-4. The hose components may be provided in any suitable material, including, for example, stainless steel, Hastelloy®, and other alloys that can be autogenously welded. Further, while the drawings only show one end of the hose assembly 200, it is to be understood that an opposite end of the hose assembly may, but need not, include a similar end connection and corresponding attachment arrangement.

The corrugated tube 220 includes a plurality of corrugations 221 and a substantially cylindrical outer cuff portion 225 (formed for example, by partially or fully expanding the endmost corrugations, as described above) extending from an endmost one 221a of the plurality of corrugations 221, radially outward of an inner diameter of the endmost corrugation, to define an interior space or socket 226 receiving an inner end nose portion 215 of the end connection 210. As installed, the cuff portion 225 may be positioned on the end connection nose portion 215 by abutment of the endmost corrugation 221a with the inner end 215a of the nose portion, with the cuff portion 225 being sized to provide for repeatable alignment with the end connection nose portion by simple insertion of the nose portion to a hard stop or abutting condition.

To position and secure the corrugated tube 220 and end connection 210 prior to welding, the weld collar 240 is positioned around the cuff portion 225 and the nose portion 215, with an inner end portion 241 of the weld collar slipped over the cuff portion and nose portion, such that the outer cuff portion 225 of the corrugated tube 220 is captured between the nose portion and the weld collar. The weld collar 240 may be mechanically attached to the end connection, for example, to maintain a desired axial position of the weld collar on the end connection prior to welding, by crimping the central portion 245 of the weld collar against the sheath 230, outer cuff 225 and nose portion 215 to provide a press fit or friction fit engagement between the central portion of the weld collar and the hose, while limiting crimped compression to prevent damage to the aligned hose components.

Figure 6:
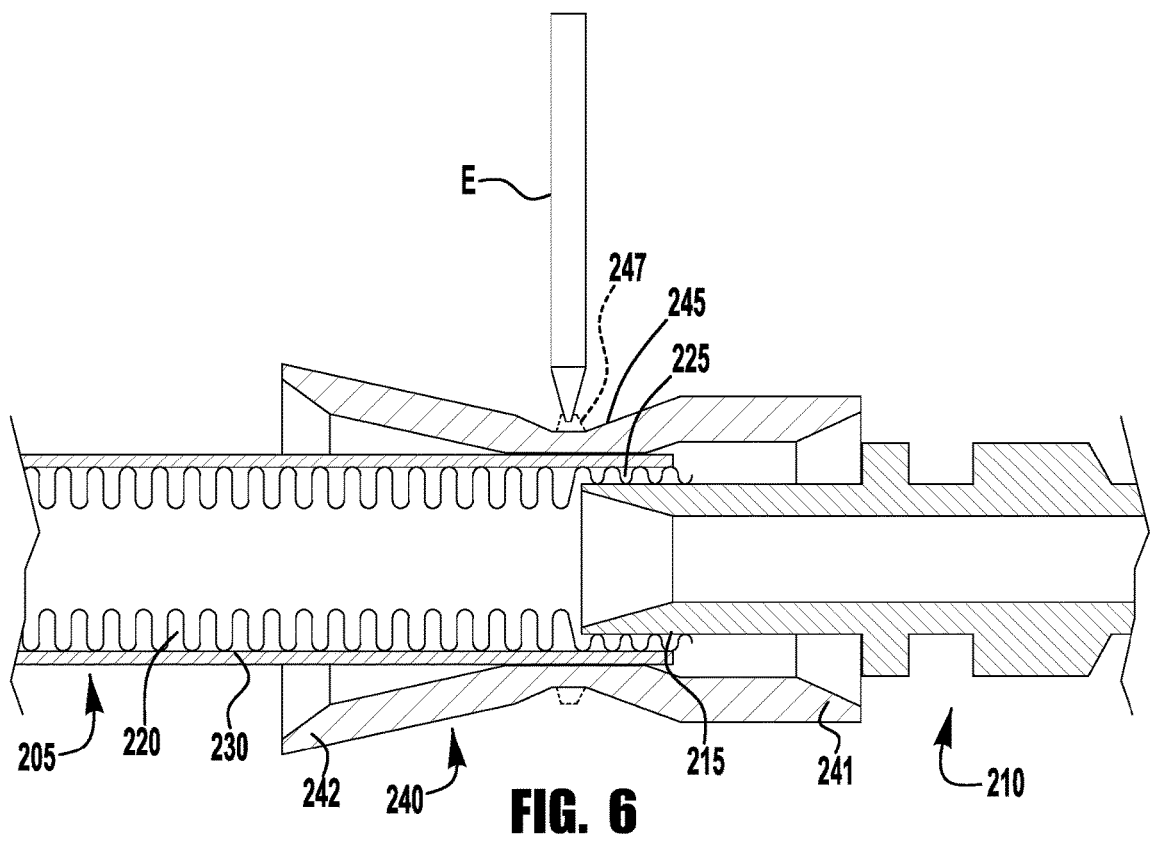
FIG. 6 is a partial cross-sectional view of the hose assembly of FIG. 5, shown in a crimped, pre-welded condition.

In a crimping operation, the crimping tool T compresses the central and inner end portions 245, 241 of the weld collar 240 for a press fit of the central portion 245 against the hose, and a close (but not necessarily press) fit of the inner end portion 241 against the hose, as shown in FIG. 6. A controlled gap between the crimped inner end portion 241 and the hose may provide for venting of weld gases during welding, for example, to prevent a weld blowout, without requiring machining of a slot or hole in the weld collar or end connection for venting, thus simplifying these components. Additionally, as evident in FIG. 5, the weld collar 240 may (but need not) be structurally symmetrical about a plane bisecting a length of the collar, with identical inner and outer end portions 241, 242, for example, to allow the weld collar to be installed on the hose end in either direction, thereby eliminating the possibility of incorrect assembly due to reverse installation of the weld collar. Alternatively (not shown), the inner end portion of the weld collar may be longer than the outer end portion, or the outer end portion may be longer than the inner end portion.

As shown in the illustrated embodiment, the weld zone defining central portion 245 of the weld collar 240 may be thinned down to facilitate weld penetration, and to control the edge of the weld puddle for improved weld aesthetics. Similar to the embodiment of FIGS. 1-3, the end connection 210, corrugated tube 220, and weld collar 240 may be configured to accommodate an autogenous weld, by which the weld may be formed by the end connection, corrugated tube, and weld collar materials without the addition of a filler material. The thinned-down, welding zone defining central portion 245 of the weld collar may (but need not) include an enlarged rib 247 providing sacrificial weld material to facilitate formation of the autogenous weld. This enlarged rib may further facilitate weld positioning or component alignment. In other embodiments, the welded assembly may use a filler material. Further, the welding operation may involve movement of the weld electrode E around the weld collar (i.e., an orbital weld), or rotation of the workpiece components proximate a stationary electrode.

As a result of an autogenous welding operations, portions of the nose portion 215, outer cuff 225 and weld collar central portion 245 are consumed in a weld puddle during a welding operation to form a uniform, full penetration weld bead (not shown), similar to that of the embodiment of FIGS. 1-3. Because the outer cuff portion 225 and surrounding sheath 230, extend around and axially outward of the welded portion of the end connection nose portion 215, the outermost edges of the cuff portion 225 and sheath 230 are disposed outside of the hose flowpath (i.e., are not wetted), and therefore do not form entrapment areas or loose burrs or other contaminants within the flowpath. This facilitates cleaning, and maintaining a clean condition, of the internal flowpath of the hose.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A hose assembly comprising:
a hose including a corrugated metal tube including a plurality of corrugations and an outer cuff portion extending from an endmost one of the plurality of corrugations, the outer cuff portion having an innermost diameter at least approximately halfway between an inner diameter and an outer diameter of the plurality of corrugations;
an end connection having an outer end defining a fluid connector and an inner end defining a nose portion received in the outer cuff portion of the corrugated metal tube; and
a collar surrounding the outer cuff portion of the corrugated metal tube and the nose portion of the end connection, with the collar, the outer cuff portion, and the nose portion being welded together, wherein the collar includes a portion axially aligned with and inwardly crimped against the nose portion of the end connection.

2. The hose assembly of claim 1, wherein the collar includes an outer end portion defining a radially inward extending lip received in interlocking engagement with an outer circumferential groove in the end connection.

3. The hose assembly of claim 1, wherein the outer cuff portion comprises a plurality of outwardly flattened corrugations.

4. A hose assembly comprising:
a hose including a corrugated metal tube including a plurality of corrugations and an outer cuff portion extending from an endmost one of the plurality of corrugations, the outer cuff portion having an innermost diameter at least approximately halfway between an inner diameter and an outer diameter of the plurality of corrugations;
an end connection having an outer end defining a fluid connector and an inner end defining a nose portion received in the outer cuff portion of the corrugated metal tube; and
a collar surrounding the outer cuff portion of the corrugated metal tube and the nose portion of the end connection, with the collar, the outer cuff portion, and the nose portion being welded together;
wherein the collar, the outer cuff portion, and the nose portion are joined together at a weld bead formed at an inner end of the nose portion, such that no portion of the corrugated metal tube axially outward of the nose portion inner end is wetted; and
wherein the collar includes a portion axially aligned with and inwardly crimped against the nose portion of the end connection.

5. The hose assembly of claim 4, further comprising a reinforcement layer surrounding the corrugated metal tube.

6. The hose assembly of claim 5, wherein the reinforcement layer comprises a braided metal sheath penetrated by the weld bead.

7. A method of making a hose assembly, the method comprising:
providing a corrugated metal tube including a plurality of corrugations and an outer cuff portion extending from an endmost one of the plurality of corrugations, the outer cuff portion having an innermost diameter at least approximately halfway between an inner diameter and an outer diameter of the plurality of corrugations;
inserting a nose portion of an end connection into the outer cuff portion of the corrugated metal tube;
positioning a portion of a collar around the outer cuff portion of the corrugated metal tube and the nose portion of the end connection; and
welding the portion of the collar, the outer cuff portion, and an inner end of the nose portion together to sealingly join the end connection with the corrugated metal tube, such that no portion of the corrugated metal tube axially outward of the nose portion inner end is wetted.

8. The method of claim 7, wherein providing the corrugated metal tube comprises deforming one or more original corrugations outward of the endmost one of the plurality of corrugations to form the outer cuff portion.

9. The method of claim 8, wherein deforming the one or more original corrugations outward of the endmost one of the plurality of corrugations to form the outer cuff portion comprises expanding an inner diameter of the deformed corrugations at least approximately halfway between inner and outer diameters of the plurality of corrugations.

10. The method of claim 7, wherein inserting the nose portion of the end connection into the outer cuff portion comprises abutting the nose portion with the endmost one of the plurality of corrugations.

11. The method of claim 7, wherein inserting the nose portion of the end connection into the outer cuff portion comprises abutting an edge of the outer cuff portion with a shoulder of the end connection.

12. The method of claim 7, wherein positioning the portion of the collar around the outer cuff portion of the corrugated metal tube and the nose portion of the end connection comprises radially deforming the collar into interlocking engagement with an outer surface of the end connection.

13. The method of claim 7, wherein positioning the portion of the collar around the outer cuff portion of the corrugated metal tube and the nose portion of the end connection comprises crimping a portion of the collar against the outer cuff portion of the corrugated metal tube and the nose portion of the end connection.

14. The method of claim 7, wherein positioning the portion of the collar around the outer cuff portion of the corrugated metal tube and the nose portion of the end connection comprises installing a radially inward extending lip of the collar in interlocking engagement with an outer circumferential groove in the end connection.

15. The method of claim 7, wherein welding the portion of the collar, the outer cuff portion, and the nose portion together comprises purging weld gases through a notch formed in one of an outer surface of the end connection and an inner surface of the collar.

16. The method of claim 7, wherein welding the portion of the collar, the outer cuff portion, and the nose portion together comprises performing an autogenous weld.

17. The method of claim 7, further comprising providing a reinforcement layer surrounding the corrugated metal tube.

18. The method of claim 7, wherein the collar is symmetrical about a plane bisecting a length of the collar prior to positioning the portion of the collar around the outer cuff portion of the corrugated metal tube and the nose portion of the end connection.

19. The method of claim 18, wherein positioning the portion of the collar around the outer cuff portion of the corrugated metal tube and the nose portion of the end connection comprises compressing the portion of the collar into press fit engagement with an outer surface of the hose.

* * * * *